United States Patent [19]

Green et al.

[11] Patent Number: 5,673,731

[45] Date of Patent: Oct. 7, 1997

[54] METHOD AND APPARATUS FOR FILLING ELONGATED PRESSURIZED FLUID CONTAINERS FROM THE SIDE

[75] Inventors: David J. Green, Brigham City; L. John Pierotti, Huntsville; Gregory J. Lang; Brent T. Mitton, both of Ogden, all of Utah

[73] Assignee: Morton International, Inc., Chicago, Ill.

[21] Appl. No.: 642,386

[22] Filed: May 3, 1996

[51] Int. Cl.$^6$ ............................................. B60R 21/00
[52] U.S. Cl. ........................ 141/18; 141/3; 141/9; 141/100; 222/3; 53/403; 280/741
[58] Field of Search ........................ 141/3, 9, 18, 21, 141/100, 325–327; 222/3; 280/736, 737, 741; 53/403

[56] References Cited

U.S. PATENT DOCUMENTS

| | | | |
|---|---|---|---|
| 3,083,875 | 4/1963 | Welty et al. | 141/21 X |
| 3,266,674 | 8/1966 | Martin | 141/3 X |
| 3,895,821 | 7/1975 | Schotthoefer et al. | 280/741 |
| 3,937,257 | 2/1976 | Biro | 141/3 |
| 4,676,402 | 6/1987 | Stetson | 222/3 |
| 4,782,982 | 11/1988 | Ellison | 141/18 X |
| 5,060,974 | 10/1991 | Hamilton et al. | 280/736 |
| 5,470,104 | 11/1995 | Smith et al. | 280/737 |
| 5,513,572 | 5/1996 | Frantom et al. | 280/737 X |
| 5,577,769 | 11/1996 | Di Giacomo et al. | 280/736 |
| 5,580,085 | 12/1996 | Cuevas et al. | 280/737 |
| 5,601,310 | 2/1997 | Di Giacomo et al. | 280/737 |
| 5,609,362 | 3/1997 | Sparks et al. | 280/741 |
| 5,615,912 | 4/1997 | O'Loughlin et al. | 280/737 |

*Primary Examiner*—J. Casimer Jacyna
*Attorney, Agent, or Firm*—Henry W. Tarring II; Gerald K. White

[57] ABSTRACT

An apparatus and method for charging fluids to elongated pressure containers, such as inflators for airbag passive restraint systems is described. The disclosed method and apparatus enables the container to be filled from the side rather than from the end. The charging of more than one fluid to different chambers in the container is also facilitated, either by enabling two charges to be conducted simultaneously, or by allowing the two charges to be conducted through a single fill port.

27 Claims, 5 Drawing Sheets

METHOD AND APPARATUS FOR FILLING ELONGATED PRESSURIZED FLUID CONTAINERS FROM THE SIDE

BACKGROUND OF THE INVENTION

1. Field of the Invention

The invention relates to a method and apparatus for filling elongated pressurized fluid containers or bottles. It is particularly useful in the filling of inflators which store pressurized fluids for eventual use in developing the gas used to inflate the airbag, or cushion, of automotive passive restraint airbag systems. While it may be useful for loading pressurized fluids to bottles having a single chamber, it is particularly useful for loading bottles having multiple chambers containing multiple types of pressurized fluid.

2. Description of Related Art

Passive restraint airbag systems are extensively provided on modern automobiles. These systems provide for the rapid deployment of an inflatable cushion, or airbag, between an occupant of the vehicle and the hard interior surfaces of the vehicle's passenger compartment whenever a sudden deceleration, such as that accompanying a collision, is detected by an automatic sensor. A variety of different inflators, which supply the gas needed for inflating the airbag, have been developed for use in such systems.

One recently developed inflator relies on the combustion of fluid fuels or the exothermic decomposition of fluid materials. U.S. Pat. No. 5,470,104 to Bradley Smith and Karl Rink, dated Nov. 28, 1995, describes several early embodiments of this inflator. In these embodiments a fluid fuel is stored in a fuel chamber while a fluid oxidant is stored in a combustion chamber and a compressed gas is stored in a further storage chamber. In operation, a crash sensor causes an electrical signal to be transmitted to an initiator which ignites and, due to its proximity to the fuel chamber, causes the fuel to be propelled at and disperse into the fluid oxidant in the combustion chamber. The fuel and oxidant combust causing a rupture disc or similar opening means to open and allow the heated and expanded combustion gases to enter the further storage chamber. In the further storage chamber they mix with, heat and expand the compressed gas stored in that chamber, causing the opening of a further opening means allowing the combined heated, expanded gases to pass to and inflate the airbag cushion. These inflators usually contain two, and sometimes three, different pressurized fluids in separate chambers. The patent does not illustrate the provisions for filling these separate chambers.

FIGS. 1 and 2 illustrate some of the provisions previously used to fill fluid fuel inflators. In the inflator illustrated in FIG. 1, fill ports 44 and 46 are provided in the end closures at each end of the elongated segmented inflator. While these fill ports function effectively, the end closures 14 and 16, in which they are located, must be thicker, and therefore heavier, than would otherwise be required if the fill ports were not located therein. Moreover, when it is desired to use an expanded, relatively high-capacity diffuser assembly 30, as is depicted in FIG. 1, the cap 40 can be welded to the remainder of the assembly only after pressurized gas has been loaded into chamber 22, a less than desirable situation.

Another technique for filling inflators which avoids the need to weld the diffuser cap to a pressurized container is illustrated in FIG. 2. In this inflator, the fill port 50 for the compressed gas chamber 22 is provided on the internal bulkhead 18 which separates the combustion chamber 20 from the compressed gas chamber 22. Compressed gas is added through fill port 50 prior to attaching the end closure 14 to the remainder of the assembly by welding at the joinder 52. Once the end closure is attached, the fluid oxidant is added to chamber 20 through fill port 44. While this filling technique avoids the need to weld the diffuser cap 40 with chamber 22 pressurized, the welding of end closure 14 to the remainder of the assembly must be conducted with chamber 22 pressurized.

The fill ports provided in these previous embodiments are normally sealed after the fill is completed by pressing a plug into place, verifying that the fill meets the specified requirements and then placing and welding a ball in the fill port over the pressed pin. This technique does not readily accommodate corrective procedures when the original fill is found to be out of specification, for instance, because the amount of gas added is incorrect, or the seal of the pressed plug in the fill port is defective permitting leakage therethrough. The pressed plug can not be readily extracted from the fill port. Forcing it through the fill port into the chamber, would leave it unconfined in the chamber where it amounts to a potential entrained hard projectile in the product gas should the inflator be activated. Accordingly, it is usually necessary to scrap those inflators which demonstrate defective fills or fill port seals.

SUMMARY OF THE INVENTION

The invention provides for filling an elongated, or bottle, shaped inflator through fill ports which are located in its side rather than in its end closures. In the past it was believed that locating fill ports in the side of such pressurized bottles would introduce weak points which would be prone to failure. Some of the new inflators incorporate internal bulkheads which separate one internal chamber from another. By locating the fill ports where they extend through the side walls and into the bulkhead, the past concern over the introduction of a weak point is alleviated. Moreover, the provision of a fill port extending into the bulkhead permits the use of a fill port configuration with a relatively long, extended bore which allows defectively filled inflators to be drained and refilled, thereby avoiding the need to scrap inflators which are out of specification. The provision of fill ports through the side also facilitates the simultaneous filling of multiple chambers.

BRIEF DESCRIPTION OF THE DRAWINGS

FIG. 3B illustrates the inflator with fill heads in position adjacent the fill ports.

DESCRIPTION OF THE INVENTION

Figure 1:
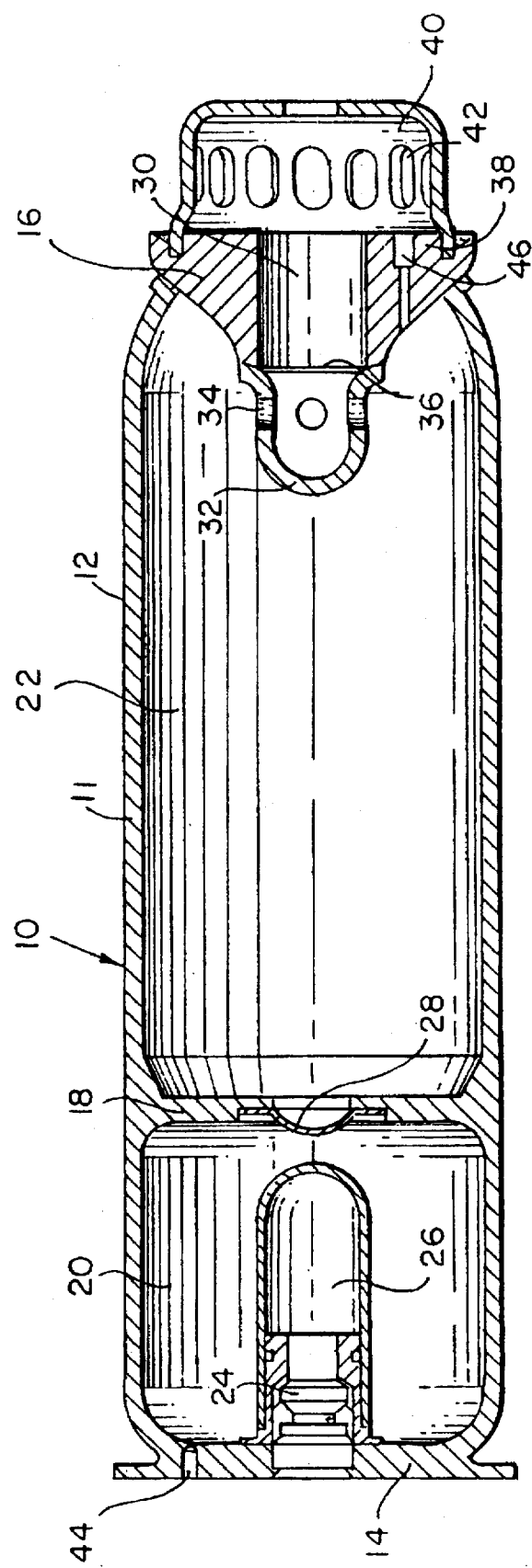
FIG. 1 illustrates a prior fluid fuel inflator wherein the combustion chamber and the further storage chamber are filled through fill ports located in the end closures provided at each end of the inflator.

FIG. 1 illustrates a prior elongated inflator 10 comprising a housing 11 formed of an elongated side wall 12 extending between a first end closure 14 and a second end closure 16. An interior partition, or bulkhead 18, divides the inflator into a first, or combustion, chamber 20 and a second, or further storage, chamber 22. Accordingly, the end closures 14, 16 of the housing and the interior partition 18, further serve as end walls of the first and second chambers 20, 22. An electrically actuated initiator, typically a squib 24, is mounted through the first end closure 14 and a fluid fuel container 26 is mounted directly in front of the firing end of the squib 24. The bulkhead 18 includes a rupture disc 28 or similar opening means which is designed to open when combustion in the combustion chamber 20 produces an elevated pressure therein. The second end closure 16 comprises a portion of the diffuser assembly 30, including a base part 32, shown partially in section, having ports 34 therein for inflation gas to pass from the storage chamber 22 into the diffuser assembly 30, a second rupture disc 36 and a conical part 38. The diffuser assembly 30 also includes a diffuser cap 40 having a number of ports 42 arranged around the circumference thereof. A first fill port 44 is provided in the first end closure 14 for charging first chamber 20 with a first pressurized fluid, typically a pressurized oxygen containing gas. A second fill port 46 provided in the conical part 38 of the second end closure 16 is for charging the second chamber 22 with a second pressurized fluid, typically a pressurized noble gas such as argon.

When a vehicle is involved in a collision, a crash sensor (not shown) transmits an electrical signal which causes the squib 24 to ignite. The resulting ignition products are directed into the fluid fuel and cause container 26 to open, or rupture, through a weakened portion provided in its wall. The fluid fuel is propelled into and combusts with the fluid oxidizer in combustion chamber 20. The resulting heated combustion gases cause the pressure in chamber 20 to rise to a level where the rupture disc 28 opens permitting the heated combustion gases to pass into and mix with the pressurized noble gas in chamber 22 which results in a heated pressurized inflation gas and raises the pressure in chamber 22 to a level which causes the second rupture disc 36 to open. Once the second rupture disc opens the heated pressurized inflation gas is free to pass through the diffuser assembly and exit the inflator through ports 42. The gas can then be directed to the interior of the airbag to cause the inflation thereof.

The inflator is filled with the first and second pressurized fluids after all of the illustrated components, except for the diffuser cap 40, have been assembled. Fill heads are inserted in the fill ports 44 and 46 and the pressurized fluids are injected into the respective chambers. While it is preferred that both fill heads be inserted and both filling operations be conducted at the same time, simultaneous insertion and filling operations are not feasible because the relative positions of the two fill ports are not uniform from one inflator to the next. The welds by which the two end closures are attached to the side walls are usually accomplished by inertial welds, wherein the respective parts are first spun in counter directions and then forced together. The heat generated when the parts are forced together causes the contacting metal faces to melt and then re-solidify, thereby welding the parts together. The relative positions of the joined parts when they re-solidify, however, cannot be precisely controlled. Therefore, the relative positions of the fill ports can not be precisely controlled. The need to constantly realign the two fill heads renders the simultaneous insertion and filling of both fill ports unfeasible.

After the chambers have been filled, a plug is inserted and forced into the fill port to establish an initial seal. The chambers and fill ports may be checked for leaks and compliance with the other fill parameters, following which, a ball is inserted and welded in the fill port above the plug to assure a long term hermetic seal. In the event that the inflator exhibits a less than satisfactory leakage rate or lacks compliance with other fill parameters, the inflator typically is scrapped because it would be prohibitively expensive to empty and refill it, or otherwise correct its deficiencies.

Figure 2:
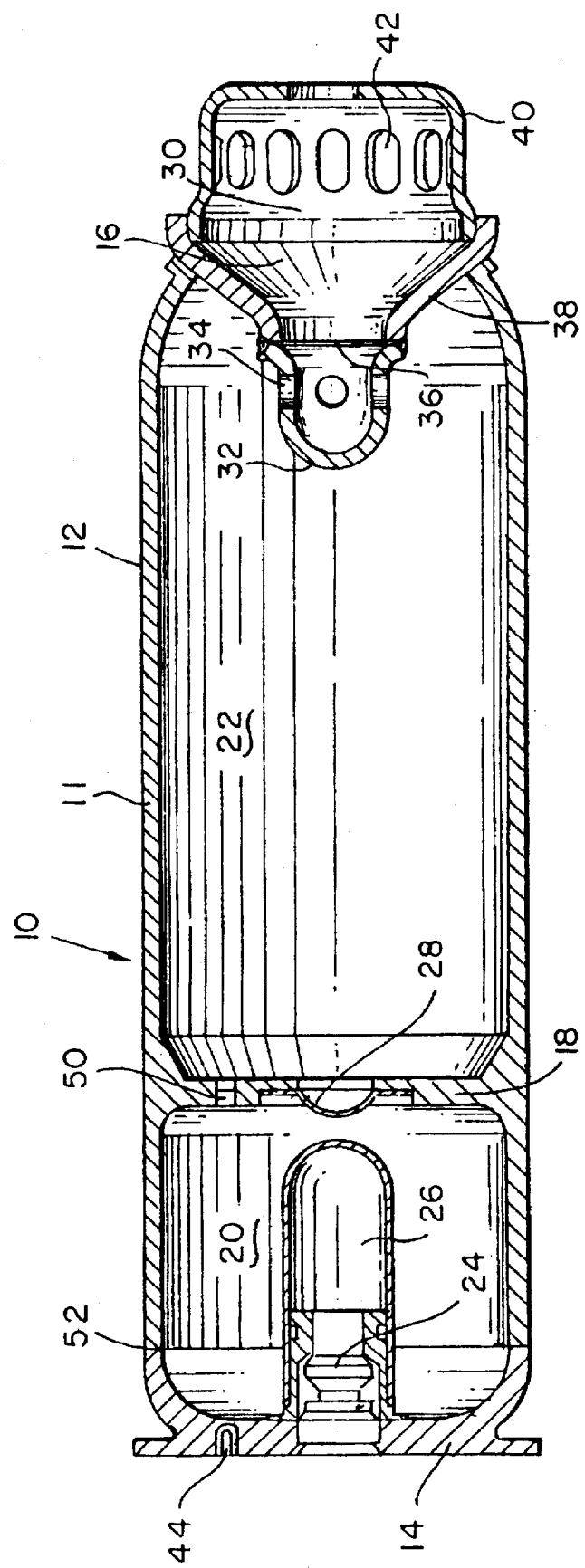
FIG. 2 illustrates a further prior fluid fuel inflator wherein the further storage chamber is filled through a fill port extending transversely through an interior bulkhead, while the combustion chamber is filled through a fill port located in the end closure contiguous to the combustion chamber.

Another prior fluid fuel inflator is illustrated in FIG. 2. Most of the components of this inflator are comparable to the corresponding components in the inflator of FIG. 1. Accordingly, the same item numbers as used in FIG. 1 are used to refer to the corresponding parts in the inflator of FIG. 2. The principal difference in the FIG. 2 inflator is the omission of the fill port 46 in the second end closure 16 and the presence of a fill port 50 extending through the partition, or bulkhead 18, from the first chamber 20 to the second chamber 22. Since the diffuser assembly 30 does not need to include a fill port, the conical part 38 of the inflator of FIG. 1 does not need to be as thick and is illustrated in FIG. 2 as being formed from stamped sheet metal. The operation of the FIG. 2 inflator is essentially the same as the operation of the inflator of FIG. 1. The method and apparatus associated with filling the chambers with pressurized fluid is the principal difference between the inflators. The inflator of FIG. 2 is assembled as illustrated except the first end closure 14 is not welded to the side wall 12 at the joinder 52 at the time the storage chamber 22 is filled by locating a fill head in the fill port 50 and injecting a pressurized fluid into the storage chamber 22. When the chamber is full a pin is inserted in the fill port, the fill and seal are checked and a ball is inserted and welded in the fill port over the inserted pin in the same manner as applied to seal the fill ports in the inflator of FIG. 1. After the filling apparatus is withdrawn, the end closure 14 is welded, usually by inertial welding, to the side wall 12 at their joinder 52. A further pressurized fluid is then injected into the first storage chamber 20 through the fill port 44. After the second fluid has been added the fill port is closed and sealed in the same manner as the fill port 50 was sealed. The filling of pressurized fluid in the chambers of this inflator suffers from some of the same shortcomings as encountered in the FIG. 1 inflator. The final weld involved in the assembly of the inflator is conducted after one of the chambers has already been pressurized. Inflators wherein one of the filled chambers leaks or is otherwise not within specifications generally must be scrapped because it is not economical to drain, refill and reseal them. It is not possible to fill both of the chambers simultaneously. Moreover, the restricted and somewhat hidden location of the fill port 50 requires the use of a relatively small fill head and complicates the mating of such head to the fill port.

Figure 3A:
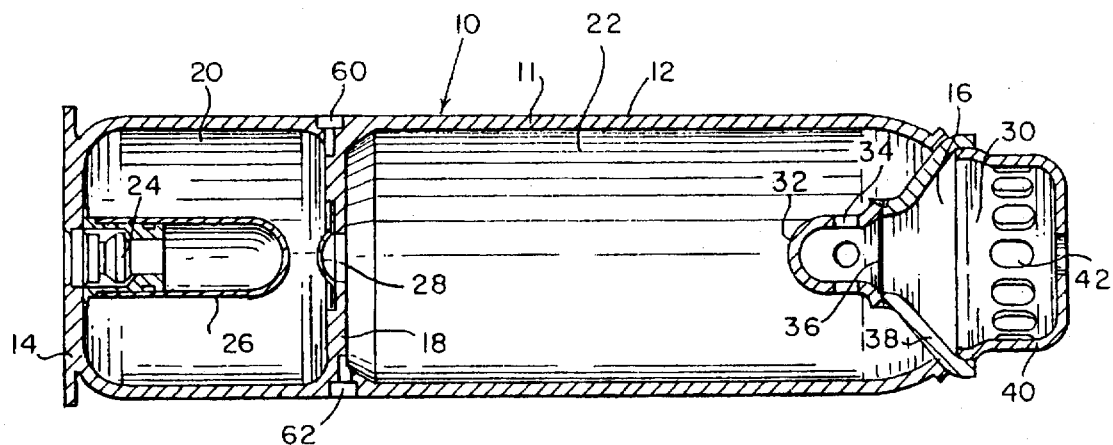
FIGS. 3A and 3B illustrate a fluid fuel inflator according to the present invention wherein both the combustion chamber and the further storage chamber are filled through separate fill ports in the side wall of the inflator.
Figure 3B:
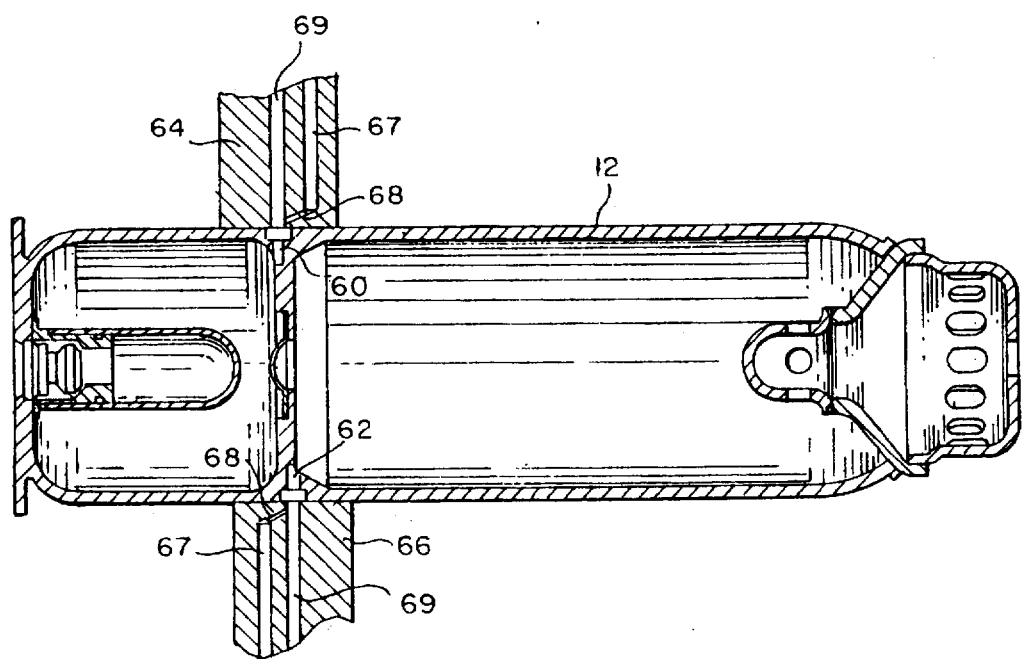

An inflator according to the present invention is illustrated in FIGS. 3A and 3B. FIG. 3A illustrates the inflator while FIG. 3B illustrates fill heads 64 and 66 in position to simultaneously fill each of the two main storage chambers of the inflator. The components of this inflator which correspond to similar components in the inflator of FIG. 1 are identified by the same item numbers. The principal difference between the inflators involves the placement of the fill ports. In the inventive inflator of FIG. 3A and 3B the first storage, or combustion, chamber 20 is filled through fill port 60 extending through the side wall 12 and into the partition, 18, which serves as a common end wall to both of the storage chambers 20, 22. The second storage chamber 22 is filled through fill port 62, which also extends through the side wall 12 and into the partition 18. As illustrated in FIG. 3B, the first chamber 20 and the second chamber 22 can be simultaneously filled by bringing fill heads 64 and 66 into a sealing relationship with the side wall 12 around the circumference of fill ports 60 and 62. In each of the fill heads, pressurized fluid is passed from a source (not shown) through an offset channel 67 in the fill head and then through a connecting channel 68 which provides fluid communication with the fill port. Depending on the particular pressurized fluid to be added, in some cases it may be desirable to extract any fluid initially present in the storage chamber prior to initiating the flow of the pressurized fluid to the chamber. In such case the channels 67 and 68 can be connected through a valve or similar switching means to a vacuum source to accomplish the desired extraction. After the pressurized fluid has been added to the chamber, a plug is fed through channel 69 in the fill head, which channel is aligned with the fill port, and is forced into the fill port to provide an initial seal of the storage chamber. After the seal is leak checked and the other fill parameters checked, a hermetic seal is provided by welding a ball in the fill port above the plug. Preferably the fill ports 60 and 62 are located opposite each other across the bulkhead 18. Locating the fill ports opposite each other allows the forces applied to hold each of the fill heads in position while the chambers are simultaneously filled, to oppose each other and preferably equalize the strains each place on the inflator.

It is not necessary that all of the fill ports pass through the side wall, it may be advantageous to provide one fill port through the side wall while providing another fill port through an end closure. When the pressure bottle contains three separate pressurized fluids in separate chambers, two of the chambers could be filled through fill ports located in the side wall and the third chamber filled through a fill port provided in the end closure.

Figure 4C:
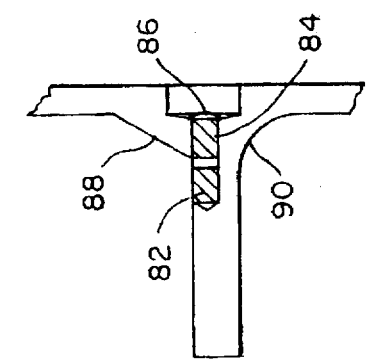
FIGS. 4A, 4B and 4C illustrate a fill port according to the present invention and a method of closing, reopening and re-closing such fill port.
Figure 4B:
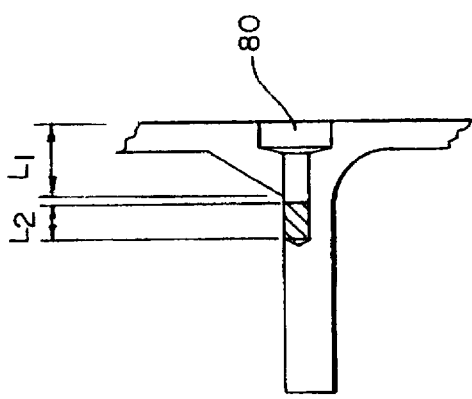
Figure 4A:
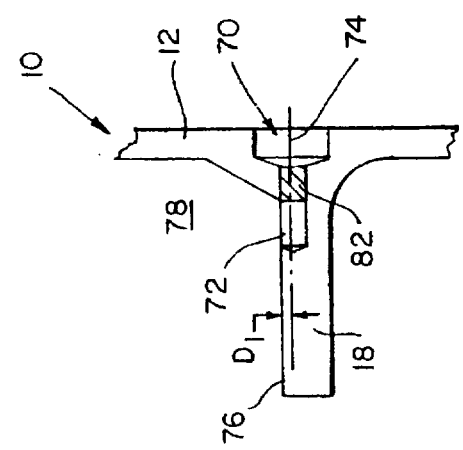

A preferred configuration and operation of a fill port and related closure plug is illustrated in FIGS. 4A, 4B and 4C. This configuration permits a storage chamber which has been filled and sealed to be easily emptied and refilled. This capability avoids the need to scrap storage containers where the fill of pressurized fluid is defective in that it fails to meet a required parameter, such as having an incorrect charged weight, or where the seal provided by the original closure plug leaks excessively. This configuration allows the original closure plug to be forced into a holding position in the extended bore of the fill port where fluid communication between the storage chamber and the exterior of the fill port is reestablished. The original closure plug is held within the extended bore and, therefore, is not free to be entrained in the product inflation gases when the inflator is ignited.

The fill port 70 comprises a passage, or bore 72, which extends through the side wall 12 of the inflator 10 into the partition, or bulkhead 18. The central axis 74 of the bore is aligned parallel with the longitudinal direction of the bulkhead and is located a distance $D_1$ from the bulkhead surface 76 facing the storage chamber 78 which the fill port is provided to fill. The distance $D_1$ is less than the radius of the bore 72 whereby the furthest extension of the bore into the bulkhead is not fully confined within the bulkhead, but instead opens into the storage chamber 78 along the side of the bore facing the chamber. The first opening to the storage chamber occurs at a length $L_1$ of the bore from the exterior surface of the side wall and which, typically, will be at least equal to the diameter of the closure plug 82. The essential function of the bore is the establishment of fluid communication between the storage chamber and the exterior of the inflator. Accordingly, the bore could be fully confined within the bulkhead and the described fluid communication be provided by a supplemental bore from the storage chamber to the main bore. The illustrated configuration, however, simplifies assembly by eliminating the need for machining the supplemental bore. A well 80 having a greater diameter than that of the bore 72 is provided adjacent the exterior surface of the side wall to assist in aligning and stabilizing a fill head.

After a predetermined quantity of pressurized fluid has been injected into the storage chamber 78, a plug 82 is pressed into the bore 72 to the position illustrated in FIG. 4A, where it forms an initial seal of the bore. The plug 82 has a length $L_2$, which is less than or equal to length $L_1$, and typically is 0.090 to 0.125 inch. In the event that quality control inspections determine that the fill of pressurized fluid is out of specification or that the initial seal is defective, the inflator can be salvaged by pressing the plug further into the bore to the position illustrated in FIG. 5B. At this position fluid communication between the fluid chamber and the exterior of the inflator is reestablished through the bore and the pressurized fluid in the storage chamber can either be permitted to escape or be held in place by a sealing device provided external to the fill port, such as on a fill head. The storage chamber can then be either refilled, or a corrective quantity of the fluid either added or withdrawn, and, as shown in FIG. 4C, the fill port sealed by pressing a second plug 84 into the sealing position in bore 72 illustrated in FIG. 4C. After the inflator passes further quality control inspections and/or tests, an insert, such as a metal ball or plug 86, is located in the bore over the plug 84, where it is welded to the wall of the bore to provide a hermetic seal. Upon activation of the inflator, the first plug 82 is held by the extended bore 72 and is not able to become entrained in the product inflation gases. In order to provide the illustrated capability to empty and refill the storage chamber it is necessary that the bore 72 extend to a depth in excess of the sum of $L_1$ plus $L_2$. Of course, if a sufficient need to drain the storage chamber more than once develops, the bore can be further extended to accommodate more than one displaced plug. The longitudinal length of the bulkhead is more than sufficient to accommodate further extensions of the bore depth. It should be noted that, because of the added thickness provided by the beveled 88, or rounded 90, cornice-like juncture of the bulkhead with the interior of the side wall, the length $L_1$ can be, and preferably is, greater than the normal thickness of the side wall. The cornice-like junctures of the bulkhead with the side wall are readily formed when the bulkhead and the side wall are manufactured as a unitary body by a double stamping process.

A further preferred fill port configuration and procedure in accord with the present invention is illustrated in FIGS. 5A through 5D. This configuration provides for filling two storage chambers through a single fill port extending into the partition, or bulkhead 18, separating the two chambers. Since every fill port is a potential leak path, this embodiment results in a single potential leak path where previously two potential leak paths were required. Manufacturing efficiency is improved due to fewer inflation rejects attributed to leakage of the stored fluids. The fill port comprises a primary passage, or bore 92, extending through the side wall 12 into the partition, or bulkhead 18; a first secondary passage, or bore 94, extending between a first location in the primary bore 92 and a first storage chamber 96; and a second secondary passage, or bore 98, extending between a second location in the primary bore 92 and a second storage chamber 100. Associated with the fill port are two plugs, a first tubular plug 102 having a passage, or bore, extending therethrough, and a second solid plug 104. Both plugs are sized with a diameter which forms a sealing relationship with the wall of primary passage 92, while also permitting the plug to be pressed or pushed along the length of the primary passage.

Figure 5D:
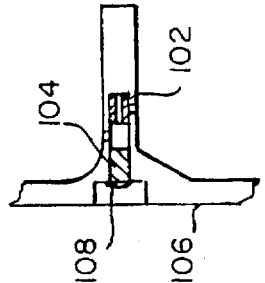
FIGS. 5A, 5B, 5C and 5D illustrate a further fill port and method of operation according to the invention which provides for the loading of two storage chambers from a single fuel port.
Figure 5C:
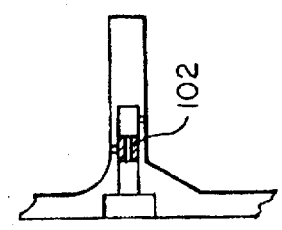
Figure 5B:
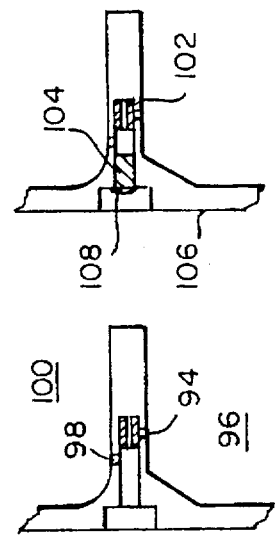
Figure 5A:
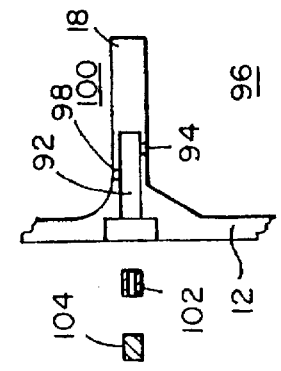

Filling of the two chambers 96 and 100 proceeds by first pressing the tubular plug 102 to a position in the primary passage 92 where, as illustrated in FIG. 5B, it spans the second secondary passage 98 effectively sealing any fluid communication between this passage 98 and the primary passage 92. A fill head (not shown) then injects a first pressurized fluid into the primary passage 92. The fluid passes through the bore in the tubular plug 102, then through the first secondary passage 94 and into the first storage chamber 96. When the desired quantity of first pressurized fluid has been added, plug 102 is pressed further into the primary passage to a further location in that passage where, as illustrated in FIG. 5C, it spans the first secondary passage 94 effectively sealing any fluid communication between the first secondary passage 94 and the primary passage 92, whereby the first pressurized fluid is effectively sealed in chamber 96. The second pressurized fluid is then injected into the fill port from the fill head. The second pressurized fluid passes through the primary passage 92 and then through the second secondary passage 98 and into the second storage chamber 100. When the desired amount of the second fluid has been charged to the second chamber, the solid plug 104 is placed in the primary passage 92 and pressed to a position, as shown in FIG. 5D, between the exterior surface 106 of the side wall 12 and the tubular plug 102 where it effectively seals the second fluid in the second chamber 100. An insert, typically a metal ball 108, is then placed and welded in the primary passage between the solid plug 104 and the side wall surface 106 to provide a hermetic seal of the fill port. If desired, the primary passage 92 can be extended further into partition 18 past the first secondary passage 94 to provide a location for holding any dislodged plug 102 which may be pressed into such extended passage in order to reopen fluid communication with a sealed first storage chamber 96 in a manner similar to the procedure described with reference to FIGS. 4A through 4C. Similarly, the length of the primary passage 92 between the first secondary passage 94 and the second secondary passage 98 can be extended to provide a holding location to which a solid plug 104 could be pushed should it be desired to reopen a second storage chamber 100.

Figure 6:
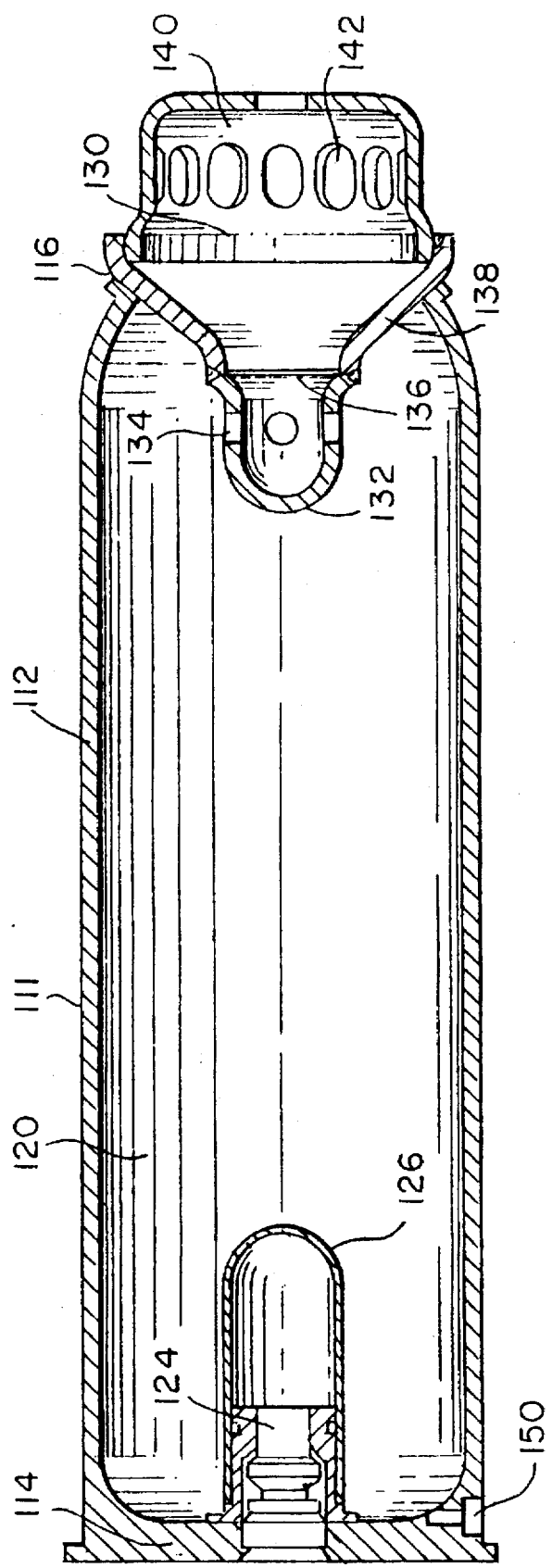
FIG. 6 illustrates a single chamber inflator adapted to be filled through a fill port passing through its side wall in accord with the invention.

A single chamber inflator in accord with the present invention is illustrated in FIG. 6. This inflator features a housing 111 comprising a side wall 112 extending between a first end closure 114 and a second end closure 116. The interior of the housing defines a storage chamber 120 for containing a pressurized fluid, such as a pressurized oxygen-containing gas. The first and second end closures also serve as end walls of the storage chamber. The first end closure 114 preferably is a unitary body formed integrally with the side wall 112 by a stamping or forging process. An electrically actuated initiator, such as squib 124, is mounted through the first end closure. A fluid fuel container 126 is mounted in front of the firing end of the squib 124. The second end closure 116 consists of the diffuser assembly 130 which comprises base part 132, shown partially in section, having a first set of ports 134, rupture disc 136, conical part 138 and diffuser cap 140 having a second set of ports 142 around the circumference thereof. A single fill port 150 extends through the side wall 112 into the first end closure 114 providing fluid communication with the storage chamber 120. Preferably, the fill port 150 is configured and functions in a manner similar to the fill port 70 illustrated in FIGS. 4A through 4C, but extending into the first end closure 114 instead of into a bulkhead 18. Most preferably, the bore of fill port 150 extends into the first end closure a distance in excess of the sum of $L_1$ plus $L_2$, as these terms were defined in the discussion of FIGS. 4A through 4C.

The pressurized fluids charged to the inflators according to the present invention can comprise gaseous or liquid fuels including hydrogen, hydrocarbons and hydrocarbon derivative fuels, such as gasoline, kerosene, $C_1$–$C_8$ paraffins, ethers, esters and alcohols; fluid oxidants such as oxygen, air and nitrous oxide ($N_2O$), provided either with or without diluents such as carbon dioxide, nitrogen and argon; inert or noble gases, such as nitrogen, helium, argon and xenon and fluid materials which are capable of exothermic decomposition, such as nitrous oxide, acetylene and hydrazine. Both the liquid and gaseous forms of gases which can be stored in a compressed liquified form are intended to be included within the scope of the term pressurized fluids as used herein.

While the inventive inflators described herein were developed for use with automotive airbag passive restraint systems, it should be apparent that they can be applied to any application which requires the rapid development of a large quantity of gas, such as for inflating life rafts, aircraft escape chutes, etc.

No unnecessary limitations on the invention should be assumed from the foregoing description. That description is intended to provide a full, clear, concise and exact explanation of the inventive inflator and how it is made and used. The scope of the invention is set forth in the following claims.

We claim:

1. An inflator for inflating an airbag in a passive restraint apparatus comprising:

a housing comprising a side wall extending between first and second end closures, a first storage chamber suitable for storing a pressurized fluid with said housing, a second storage chamber suitable for storing a second pressurized fluid within said housing, a partition separating said first storage chamber from said second storage chamber, and at least one fill port extending through said side wall and into said partition, said fill port communicating with said first storage chamber to permit charging of said first storage chamber with a fluid.

2. An inflator for inflating an inflatable apparatus comprising:

a housing comprising a side wall extending between first and second end closures, and a partition extending from said side wall at a position between said first and second end closures, a first storage chamber defined by said partition, said first end closure and the portion of said side wall extending between said partition and said first end closure, a second storage chamber defined by said partition, said second end closure and the portion of said side wall extending between said partition and said second end closure, at least one fill port extending through said side wall and into said partition, said fill port being adapted for charging at least one of said first and second storage chambers with a fluid.

3. The inflator of claim 2, wherein:

said partition normally separates said first storage chamber from said second storage chamber in a fluid tight manner, and said partition includes a rupturable portion located between the first and second storage chambers whereby the rupture of such portion establishes fluid communication between said first and second storage chambers.

4. The inflator of claim 2, wherein:

said at least one fill port includes a passage which extends a first length $L_1$ from the outer surface of said side wall through said side wall and said partition to an opening in said passage which provides fluid communication with said first storage chamber, and a plug located in said passage, said plug having a length $L_2$ which is equal to or less than said first length $L_1$.

5. The inflator of claim 4, wherein:

said passage extends through said side wall and said partition a total distance which is greater than the sum of the lengths $L_1$ and $L_2$.

6. The inflator of claim 4, wherein:

a seal is located in said passage between said plug and the outer surface of said side wall.

7. The inflator of claim 6, wherein:

said seal comprises an insert welded in said passage.

8. The inflator of claim 4, further comprising:

a second fill port through said side wall and said partition, said second fill port being adapted for charging a fluid to said second storage chamber.

9. The inflator of claim 2 wherein:

a single fill port includes a primary passage extending through said side wall and into said partition, said primary passage joins with a first and a second secondary passage within said partition, said first secondary passage provides fluid communication between said primary passage and said first storage chamber, and said second secondary passage provides fluid communication between said primary passage and said second storage chamber.

10. The inflator of claim 9, wherein:

said first secondary passage joins with said primary passage at a first location along the length of said primary passage which is further from the surface of said side wall than is a second location along said primary passage where said second secondary passage joins said primary passage.

11. The inflator of claim 10, further comprising:

a first stored fluid in said first storage chamber, and a tubular plug located at said first location in said primary passage, said tubular plug having a size and shape such that the exterior wall of said plug forms an essentially fluid tight seal with the wall of said primary passage.

12. The inflator of claim 11, further comprising:

a second stored fluid in said second storage chamber, and a solid plug located in said primary passage between said tubular plug and the surface of said side wall.

13. The inflator of claim 12, wherein:

said first stored fluid is a different fluid than said second stored fluid.

14. The inflator of claim 13, wherein one of said stored fluids comprises an oxidizing gas.

15. The inflator of claim 13, wherein one of said stored gases comprises an inert gas.

16. The inflator of claim 13, wherein one of said gases comprises $N_2O$.

17. The inflator of claim 12, further comprising:

an insert welded in said primary passage at a location between said solid plug and the surface of said side wall.

18. The inflator of claim 2, wherein said inflatable apparatus is the airbag of a passive restraint system suitable to be mounted in a transportation apparatus.

19. The inflator of claim 2, wherein said fill port comprises a main bore extending through said side wall and into said partition along an axis which is located less than the radius of said bore from the surface of said partition adjacent said first storage chamber.

20. The inflator of claim 2, comprising:

two fill ports extending through said side wall and into said partition, the first of said fill ports being adapted for charging a fluid to said first storage chamber and the second of said fill ports being adapted for charging a fluid to said second storage chamber.

21. A method of filling an inflator, comprising:

(a) providing an inflator having a side wall extending between first and second end closures and a partition extending from said side wall at a location between said end closures, said inflator including a first storage chamber on a first side of said partition and a second storage chamber on a second side of said partition, (b) said inflator having a fill port comprising a primary passage extending through said side wall and into said partition, a first secondary passage from said primary passage to said first storage chamber and a second secondary passage from said primary passage to said second storage chamber, (c) locating a tubular plug in said primary passage at a location where it extends across the junction of said second secondary passage with said primary passage, (d) flowing a first fluid through said primary passage, said tubular plug and said first secondary passage and into said first storage chamber, and (e) relocating said tubular plug to a further location in said primary passage where it extends across the junction of said first secondary passage with said primary passage thereby sealing said first fluid in said first storage chamber.

22. The method of claim 21, further comprising the continuing steps of:

(f) flowing a second fluid through said primary passage, said second secondary passage and into said second storage chamber, (g) locating a solid plug in Said primary passage at a location between said tubular plug and the outer surface of said side wall thereby sealing said second fluid in said second storage chamber.

23. The method of claim 22, further comprising the continuing steps of:

(h) locating an insert in said primary passage between said solid plug and the outer surface of said side wall, and (i) welding said insert to the adjoining portion of said inflator whereby said insert further seals said primary passage.

24. An inflator for inflating an airbag in a passive restraint apparatus comprising:

a housing having a first end and a second end and comprising a side wall extending between said first and second ends, a first storage chamber suitable for storing a pressurized fluid extending within said side wall from a first end wall to a second end wall, and at least one fill port extending through said side wall to said first storage chamber, said fill port extending through said side wall and into said first end wall.

25. The inflator of claim 24, wherein:

said first end wall also closes one of the ends of said housing.

26. The inflator of claim 24, wherein said fill port comprises a main bore extending through said side wall and into said first end wall along an axis which is located less than the radius of said bore from that surface of said first end wall which is adjacent said first storage chamber.

27. The inflator of claim 24, further comprising:

a second storage chamber suitable for storing a second pressurized fluid extending within said side wall from said first end wall to a third end wall.

* * * * *